July 7, 1953  J. O. RICHARD  2,644,718
SPRINKLING APPARATUS
Filed Aug. 20, 1951
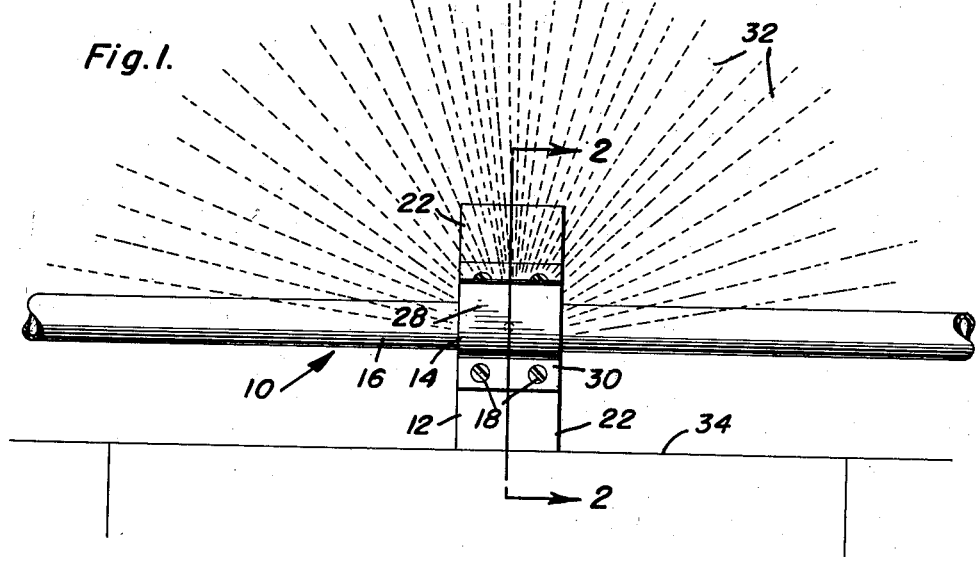
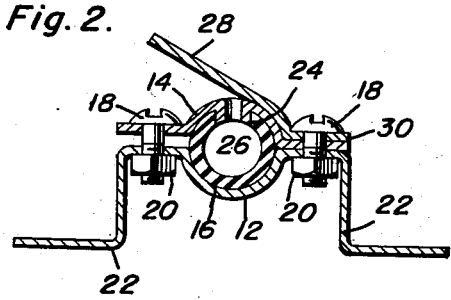
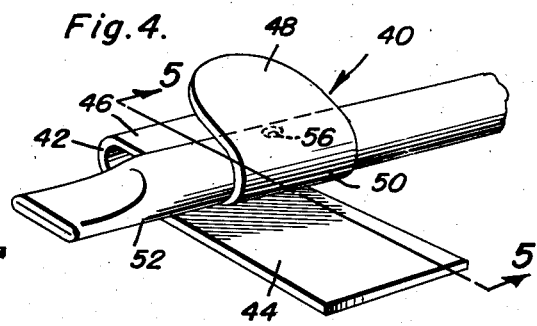
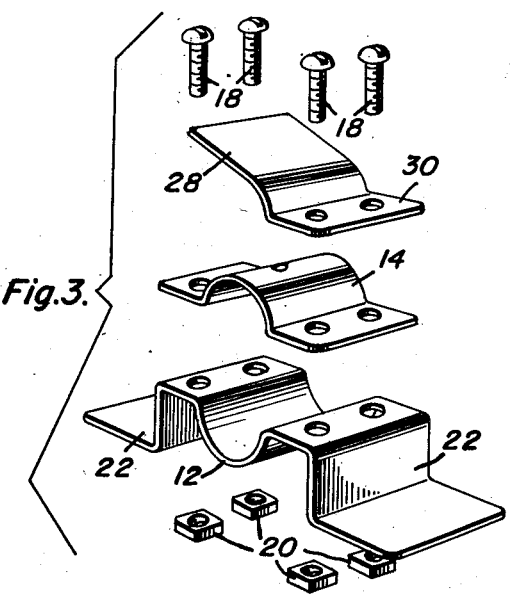
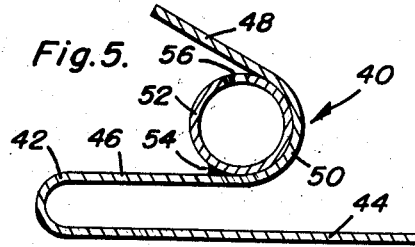
Joseph O. Richard
INVENTOR.

Patented July 7, 1953

2,644,718

UNITED STATES PATENT OFFICE 2,644,718

SPRINKLING APPARATUS

Joseph O. Richard, Lake Worth, Fla.

Application August 20, 1951, Serial No. 242,709

3 Claims. (Cl. 299—106)

This invention relates to new and useful improvements and structural refinements in sprinkling apparatus, and the principal object of the invention is to provide an apparatus of the character herein described, which may be conveniently and effectively employed for spraying liquid in an arc of approximately 180 degrees from longitudinally spaced points upon a conduit, such as for example, a rubber water hose or water pipe. Particularly, the invention is well-adapted for installation adjacent a wall or a sidewalk, where the spray is to be discharged only to one side of the conduit.

Some of the advantages of the invention reside in its simplicity of construction, in its efficient and dependable operation, and in its adaptability to economical manufacture.

With the above more important objects and features in view and such other objects and features as may become apparent as this specification proceeds, the invention consists essentially of the construction and arrangement of parts as shown in the accompanying drawings in which:

Figure 1 is a top plan view of the invention;

Figure 2 is a vertical sectional view thereof, taken substantially on the plane of the line 2—2 of Figure 1;

Figure 3 is a group perspective view of the clamp member and deflector plate used in the invention;

Figure 4 is a perspective view of a modified embodiment of the invention; and,

Figure 5 is a sectional view, taken on the plane of the line 5—5 in Figure 4.

Like characters of reference are employed to designate like parts in the specification and throughout the several views.

Referring now to the accompanying drawings in detail, the sprinkling apparatus is designated generally by the reference character 10 and embodies in its construction a clamp member, including a pair of sections 12, 14, which are adapted to be affixed to a liquid conduit, such as for example, a rubber water hose 16.

The clamp member sections 12, 14 are connected together by a plurality of screws 18 and nuts 20, and it is to be noted that the lower clamp member section 12 is provided with downwardly and outwardly extending feet 22, whereby to support the hose 16 some distance above the ground.

The portion of the hose 16 to which the device is clamped is provided with a discharge orifice 24 and the upper clamp member section 14 is formed with an annular, inturned flange 26 which extends into the orifice 24, so that water under pressure may escape outwardly in the form of a jet from the hose 16. However, an angularly disposed deflector plate 28, provided with a mounting flange 30 is affixed to the clamp member by two of the aforementioned screws 18 and is disposed in an oblique plane which is intersected by the axis of the orifice 24, so that the jet of water emerging from the orifice impacts against the underside of the inclined plate 28 and is deflected laterally in the form of a spray over an arc of approximately 180 degrees at one side of the conduit 16, this being illustrated at 32 in Figure 1. Thus, if the conduit 16 is located in the closed proximity of a wall, or a sidewalk as indicated at 34, the water will be sprayed only in one direction, that is, to one side of the wall or sidewalk, but it is to be noted that by simply reversing the position of the deflector plate 28 on the clamp member, the direction of spray may also be reversed.

In the modified form of the invention shown in Figures 4 and 5 and designated by the reference numeral 40, the sprinkler is formed integrally from a simple, reversely curved strip 42 including a horizontal base portion 44, an intermediate portion 46 which is spaced above the portion 44, and an obliquely disposed deflector 48, there being an arcuate portion 50 between the portions 46, 48, which provides a seat for a conduit 52. The latter may be a metal pipe, for example, to which the unit 50 may be welded or otherwise secured, as at 54. The pipe 52 is provided with an orifice 56 under the deflector 48, as shown.

It is believed that the advantages and use of the invention will be readily understood from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described my invention, what is claimed as new is:

1. A sprinkling apparatus comprising a conduit having a wall provided with an orifice, a clamp member secured to said conduit, a deflector plate secured to said clamp member and disposed in an oblique plane intersected by the axis of said orifice, and an inturned annular reinforcing flange provided on said clamp member and extending into said orifice.

2. A sprinkler device for use with a conduit having a wall provided with an orifice, said device comprising a combined support and clamp member consisting of two separable sections adapted for mounting upon a conduit, an inclined deflector plate attached to said member and adapted to be disposed above a conduit orifice, and an inturned annular reinforcing flange provided on one of said clamp member sections and adapted to extend into said orifice.

3. A sprinkler device for use with a conduit having a wall provided with an orifice, said device comprising a combined support and clamp member including a lower section having a raised intermediate portion to receive a conduit and a pair of downturned end portions affording legs, an upper section positioned on the intermediate portion of said lower section, a plurality of clamping screws connecting the upper and lower sections together, said upper section being provided with an opening, an inturned annular flange provided on said upper section in register with said opening and adapted for insertion in the orifice of the stated conduit, and an inclined deflector plate secured by one of said screws to said member and extending above said opening.

JOSEPH O. RICHARD.

References Cited in the file of this patent

UNITED STATES PATENTS

| Number | Name | Date |
| --- | --- | --- |
| 1,177,192 | Lavender | Mar. 28, 1916 |
| 1,364,163 | Wampler | Jan. 4, 1921 |
| 1,659,470 | Owen et al. | Feb. 14, 1928 |
| 1,811,042 | Desmond | June 24, 1931 |
| 1,848,700 | Deister | Mar. 8, 1932 |
| 2,184,990 | Conn | Dec. 26, 1939 |